Dec. 19, 1950 W. H. CUTTINO 2,534,902
AUTOMATIC SWITCHING SYSTEM
Filed Nov. 19, 1948
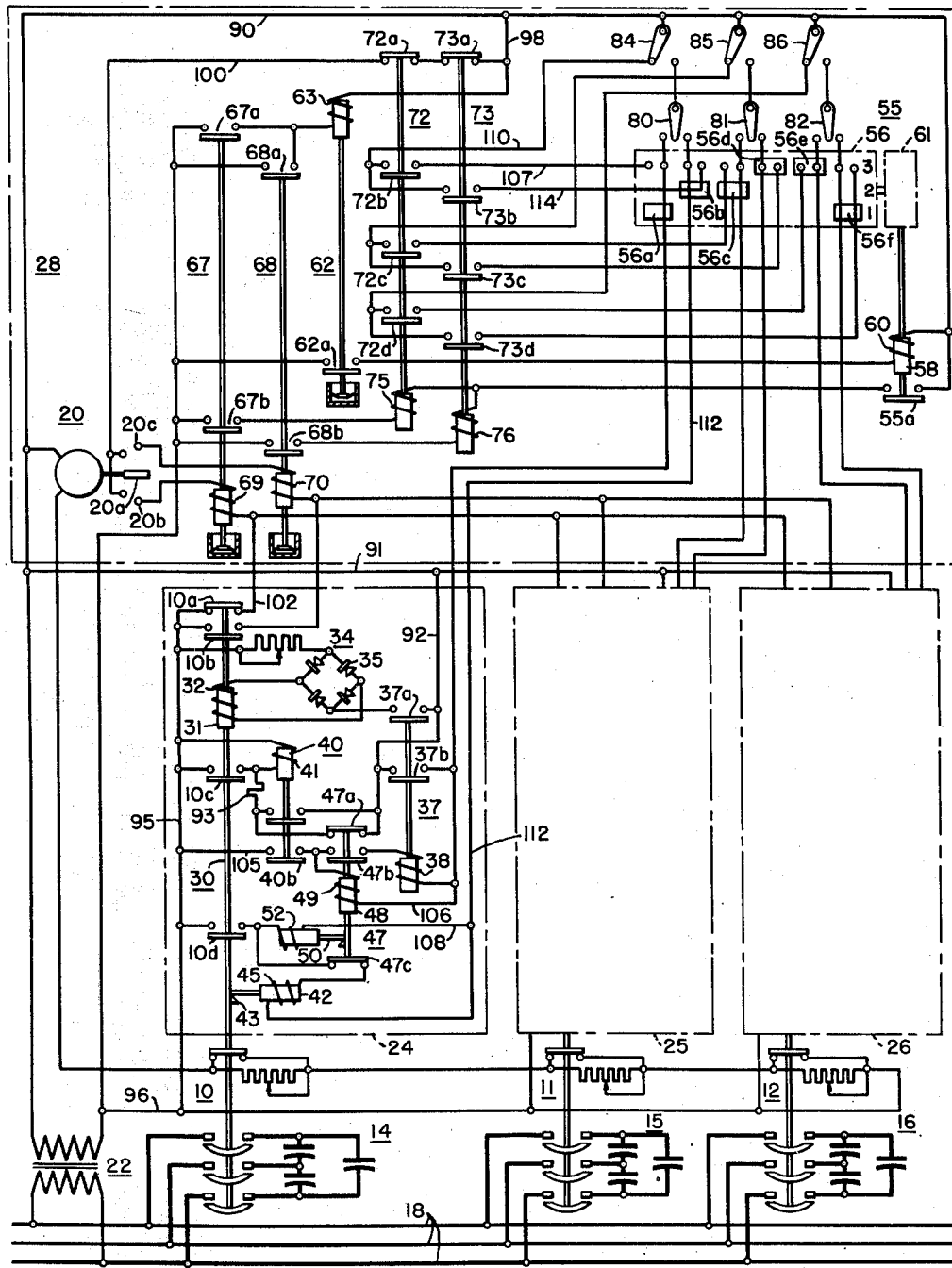
WITNESSES:
Robert C. Baird
F. V. Giolma
INVENTOR
William H. Cuttino.
G. M. Crawford
ATTORNEY Patented Dec. 19, 1950

2,534,902

UNITED STATES PATENT OFFICE 2,534,902

AUTOMATIC SWITCHING SYSTEM

William H. Cuttino, Pittsburgh, Pa., assignor to Westinghouse Electric Corporation, East Pittsburgh, Pa., a corporation of Pennsylvania Application November 19, 1948, Serial No. 61,042

7 Claims. (Cl. 171—97)

My invention relates generally to automatic switching systems, and it has reference in particular to automatic switching systems for capacitors and the like which are to be connected to and disconnected from a power circuit for regulating purposes.

Generally stated, it is an object of my invention to provide an automatic switching system for capacitors that is simple and inexpensive to manufacture, and is reliable and effective in operation.

More specifically, it is an object of my invention to provide, in an automatic switching system for capacitors, for sequencing the operation of the several switches connecting the capacitors to a power circuit so as to equalize the duty on the switches and capacitors.

Another object of my invention is to provide, in an automatic switching system for capacitors, for either sequentially disconnecting a capacitor previously connected to the circuit, or for connecting to the power circuit another capacitor in a predetermined sequence.

It is also an object of my invention to provide, in an automatic switching system for capacitors, for utilizing a sequence relay which is operable to successive positions to provide a closing circuit for one switch and a trip circuit for another switch of different pairs of capacitor switches depending upon the operating position of a control relay responsive to an electrical characteristic of the circuit with which the capacitors are associated.

Yet another object of my invention is to provide, in an automatic switching system for capacitors, for progressively connecting one capacitor after another to a power circuit in order to equalize the duty on the capacitors.

It is an important object of my invention to provide, in an automatic switching system for a plurality of capacitors, for always connecting to a power circuit a capacitor other than the one which has just been disconnected, unless all of the other capacitors are already connected.

Other objects will, in part, be obvious and will, in part, be explained hereinafter.

In practicing my invention in one of its forms, a control relay responsive to the voltage or other characteristic of a power circuit determines generally whether one breaker of a plurality for connecting capacitors to the power circuit is to be tripped or closed. A sequence relay actuable to different positions in response to operation of the control relay sets up in each position a closing circuit for a different one of the breakers and a trip circuit for another breaker. The sequence relay also controls, in conjunction with the control relay, auxiliary relay means which function to complete one of the closing and trip circuits set up by the sequence relay, depending upon the operating position of the control relay. If operation of the auxiliary control means cannot complete one of the operating circuits within a predetermined time interval, the sequence relay is actuated to a succeeding position in an attempt to set up another pair of closing and trip circuits, one of which may be completed by the auxiliary relay means.

For a more complete understanding of the nature and scope of my invention, reference may be made to the following detailed description, which may be read in connection with the accompanying drawing in which the single figure is a diagrammatic view of an automatic switching system embodying the invention in one of its forms.

Referring to the drawing it will be seen that circuit breakers 10, 11 and 12 may be provided for controlling the connection of a plurality of banks of capacitors 14, 15 and 16 to the conductors 18 of an electric power circuit under the control of a control relay 20 which may be energized from the conductors 18 through a control transformer 22. In this instance the control relay 20 is shown as a voltage responsive relay although it is to be understood that a relay responsive to any other circuit characteristic may be used. The circuit breakers 10, 11 and 12 may be provided with individual control means contained within the enclosures 24, 25 and 26, respectively. Common control means for effecting operation of the several circuit breakers in response to operation of the control relay 20 is shown as contained within an enclosure 28.

Since the individual control means for the three circuit breakers are substantially identical, all details of these control means have been omitted from the enclosures 25 and 26 in order to simplify the drawing. It will be realized that each of these enclosures contains exactly duplicate equipment to that which is shown in detail in the enclosure 24 associated with the circuit breaker 10.

The three circuit breakers 10, 11 and 12 may be of any suitable type and may, like the circuit breaker 10, comprise an operating mechanism 30 provided with an armature 31 having an operating winding 32. Energization of the operating winding 32 may be effected from the control transformer 22 through a bridge circuit 34 of rectifier devices 35 by means of a closing relay 37 having an operating winding 38.

A cutoff relay 40 having an operating winding 41 may be provided for deenergizing the operating winding 38 of the closing relay in response to closing of the circuit breaker. The breaker 10 may be retained in the closed position by latch means comprising a movable armature 42 disposed to engage a projection 43 on the breaker mechanism, and provided with a trip winding 45 for releasing the armature from the projection.

Automatic control of the closing relay and trip means may be provided by means of a lockout relay 47, comprising an armature 48 having an operating winding 49 and a latch element 50 disposed to hold the armature 48 in the operated position, and provided with a reset winding 52 for releasing it to the deenergized position.

In order to provide for equalizing the duty on the breakers 10, 11 and 12 and the associated banks of capacitors 14, 15 and 16, sequencing means may be provided, such as the sequence relay 55 which may be disposed to set up a closing circuit for one circuit breaker and a trip circuit for another circuit breaker in different combinations for each of its operating positions.

The relay 55 may, for example, comprise a drum 56 having a plurality of contact members 56a, 56b, 56c, 56d, 56e and 56f disposed thereon. An armature 58 having an operating winding 60 may be provided for operating an actuating mechanism 61, such as a ratchet mechanism or the like, to actuate the drum 56 to successive ones of its three operating positions 1, 2 and 3 each time the operating winding 60 is energized. The contact members 56a through 56f may be so arranged that in position 1 energizing circuits may be set up for closing breaker 10 and tripping breaker 12; in position 2 circuits may be set up for tripping breaker 10 and closing breaker 11, while in position 3 circuits may be set up for tripping breaker 11 and closing breaker 12.

Operation of the sequence relay 55 may be effected by means of a time delay relay 62 having an operating winding 63. The relay 62 may be of the delayed closing type, so that it does not provide an energizing circuit for the operating winding 60 of the sequence relay until a predetermined time after the operating winding 63 of the time delay relay is energized. The voltage responsive control relay 20 may be provided with a moving contact member 20a disposed to engage either of stationary contact members 20b or 20c depending on whether the voltage of the conductors 18 is to be raised or lowered. Time delay control means comprising control relays 67 and 68 having operating windings 69 and 70, respectively, may be provided for controlling the energization of the time delay relay 62, and hence the operation of the sequence relay 55. The relays 67 and 68 may be of the delayed dropout type so as to provide for timing the operating interval of a closing or tripping operation.

Auxiliary control relays 72 and 73 having operating windings 75 and 76, respectively, may be provided for completing either a closing or a tripping circuit for each of the three circuit breakers 10, 11 and 12 in response to the operating position of the voltage responsive control relay 20. The auxiliary control relays may be disposed to interrupt the energizing circuits for the control relays 67 and 68 at contact members 72a and 73a in order to provide for deenergizing the control relays and resetting the time delay relay 62 after a predetermined interval of time, in the event that no effective operating circuit can be completed for any one of the breakers for the particular operating position of the sequence relay.

Manual operation of the circuit breakers 10, 11 and 12 may be provided for by means of manual control switches 80, 81 and 82 which may be operable to "close" or "trip" positions for closing or tripping each of the breakers. Each of the breakers may be set up for either manual or automatic control by means of control switches 84, 85 and 86.

With the control switches 84, 85 and 86 in the "automatic" position as shown, the circuit breakers 10, 11 and 12 may be operated in the sequence determined by the sequence relay 55 in accordance with the operating position of the voltage responsive relay 20. With the system connected as shown, the cutoff relays for each of the breakers will be in the energized position so long as power is applied to the conductors 18. For example, the operating winding 41 of the cutoff relay 40 will be energized over a circuit extending from one side of the control transformer through conductors 90, 91 and 92, contact members 47a of the lockout relay 47, resistor 93, operating winding 41 and conductors 95 and 96 to the other side of the control transformer 22.

With the circuit breakers 10, 11 and 12 in the open position and the sequence relay 55 in the number 3 position, a drop in the voltage causes the voltage responsive relay 20 to operate so that contact member 20a engages contact member 20b. An energizing circuit is thereupon provided for the operating winding 69 of the control relay 67, extending from conductor 90 through conductor 98, contact members 73a, contact members 72a, conductor 100, contact members 20a and 20b, operating winding 69, conductor 102 and contact members 10a of the circuit breaker 10, to conductors 95 and 96 and the other side of the control transformer. Control relay 67 operates, completing an obvious energizing circuit for the time delay relay 62 through contact members 67a, and setting up an energizing circuit for the operating winding 75 of the auxiliary control relay 72 through contact members 67b.

Should the voltage responsive relay 20 remain in the position to which it operated, for a predetermined length of time, time delay relay 62 operates and completes an energizing circuit for the operating winding 60 of the sequence relay 55. The sequence relay 55 operates to the number 1 position and sets up an energizing circuit for closing breaker 10 through contact members 56a, and a circuit for tripping breaker number 12 through contact members 56f. At the same time the energizing circuit for the operating winding 75 of the auxiliary control relay 72 will be completed through contact members 55a of the sequence relay 55.

When the auxiliary control relay 72 operates to the energized position, it interrupts the energizing circuit for the operating winding 69 of the control relay 67 at contact members 72a, and thus starts to time out the predetermined interval of time at the end of which the control relay 67 will return to the deenergized position. Operation of the auxiliary control relay 72 to the energized position also completes the energizing circuit for closing the circuit breaker 10, which circuit was set up through contact members 56a of the sequence relay. Operation of the auxiliary control relay 72 completes, for example, an energizing circuit for the operating winding 49 of the lockout relay 47, extending from conductor 95, through conductor 105, contact members 40b, operating winding 49, conductor 106, contact members 56a, conductor 107, contact members 72b, conductor 110 and control switch 84 to conductor 90 and the other side of the control transformer.

The lockout relay 47 operates and completes an energizing circuit for the operating winding 38 of the closing relay 37 through contact members 47b. The closing relay operates, completing an energizing circuit for the operating winding 32 of the circuit breaker 10 through contact members 37a, and providing a holding circuit for itself through contact members 37b. As soon as the circuit breaker 10 closes, a shunt is provided about the operating winding 41 of the cutoff relay 40, through contact members 10c of the breaker, for returning the cutoff relay to the deenergized position in which the energizing circuit for the operating winding 38 of the closing relay 37 is interrupted at contact members 40b.

After a predetermined length of time, which is sufficient for the closing and cutoff relays to have operated, the control relay 67 returns to the deenergized position, and interrupts the energizing circuit for the operating winding 63 of the time delay relay 62 at contact members 67a. Upon return of the time delay relay 62 to the deenergized position the operating winding 60 of the sequence relay 55 will be deenergized and the sequence relay will be ready for a subsequent operation, in the event that the voltage relay 20 still remains in the same operating position, has returned to the same operating position or has operated to its other operating position. The return of the cutoff relay 40 to the deenergized position opens contact members 40b in the circuit of the operating winding 38 of the closing relay 37 and prevents reclosing of the breaker 10 until the lockout relay 47 is reset.

The common control equipment of the circuit breakers 10, 11 and 12 is now in a position so that upon its next operation it may either close circuit breaker 11 or trip circuit breaker 10. Should the voltage relay 20 remain in the position to which it previously operated, or should it return to this position, the control relay 67 will again be energized to complete an energizing circuit for the time delay relay 62 and set up an operating circuit for the auxiliary control relay 72. If the voltage relay 20 remains in this operated position for a predetermined interval of time, time delay relay 62 operates and completes an energizing circuit for the operating winding 60 of the sequence relay 55. The sequence relay 55 operates to the number 2 position to set up a closing circuit for breaker 11 through contact members 56c and a tripping circuit for breaker 10 through contact members 56b. At the same time it completes the operating circuit for the auxiliary control relay 72 through contact members 55a.

The auxiliary control relay completes an operating circuit for breaker 11 through contact members 56c and contact members 72c in a manner similar to that described in connection with the closing of circuit breaker 10. The control equipment for the circuit breaker 11 functions to close the breaker in exactly the same manner as set forth in detail in connection with the description of the closing operation for breaker 10. At the end of the time interval determined by the dropout time of the control relay 67, the time delay relay 62 will be again deenergized and the sequence relay 55 will be deenergized to provide for a subsequent operation.

Should the voltage relay 20 continue to call for more capacity, the sequence relay 55 would be operated to the number 3 position to effect a closing of breaker 12 in a like manner. Subsequent energization of the control relay 67 would be thereupon prevented, since, with all of the breakers closed the circuit to the operating winding 69 is interrupted by the breaker contact members corresponding to contact members 10a.

Should the control relay 20 thereafter operate to the other operating position in which contact member 20a engages stationary contact member 20c, an energizing circuit would thereupon be provided for the operating winding 70 of the control relay 68. Operation of this relay provides an obvious energizing circuit for the operating winding 63 of the time delay relay 62 through contact members 68a and at the same time sets up an operating circuit for the auxiliary control relay 73 through contact members 68b.

After a predetermined interval of time the time delay relay 62 completes an energizing circuit for the operating winding 60 of the sequence relay 55 through contact members 62a. The sequence relay thereupon operates to the number 1 position so as to set up a closing circuit for breaker 10 and a trip circuit for breaker 12 through contact members 56f. At the same time the operating circuit for the auxiliary control relay 73 is completed at contact members 55a and the auxiliary control relay 73 operates to complete the trip circuit for breaker 12, through contact members 73d and contact members 56f to the individual control equipment of breaker 12. At the same time the energizing circuit for the control relay 68 is interrupted at contact members 73a and after a predetermined interval of time, relay 68 returns to the deenergized position, deenergizing the time delay relay 62 and restoring the sequence relay to the deenergized position.

Should the voltage relay 20 again call for disconnecting a capacitor from the conductors 18, engagement of contact member 20a with contact members 20c will again complete an energizing circuit for the operating winding 70 of the auxiliary control relay 68. Operation of relay 68 completes an energizing circuit for the time delay relay 62 and also sets up an operating circuit for the auxiliary control relay 73. After an interval of time determined by the operating time of the time delay relay 62, the operating winding 60 of the sequence relay 55 will again be energized through contact members 62a and the relay will operate to the number 2 position. In this position a trip circuit is set up for breaker 10 through contact members 56b while a closing circuit for breaker 11 is set up through contact members 56c.

Operation of the sequence relay also completes an operating circuit for the auxiliary control relay 73 through contact members 55a. Operation of the auxiliary control relay 73 interrupts the energizing circuit for the control relay 68 at contact members 73a and completes a tripping circuit for breaker 10 through contact members 73b and contact members 56b. This circuit may be traced from the right-hand terminal of the control transformer 22, through conductors 96 and 95, contact members 10d, reset winding 52, conductors 108 and 112, contact members 56b, conductor 114, contact members 73b, conductors 110 and 90, back to the other side of the control transformer.

Energization of the reset winding 52 actuates the latch element 50, releasing armature 48 which returns to the deenergized position. A circuit is thereupon provided for trip winding 45 through contact members 47c, releasing the armature 42, opening the circuit breaker 10, and disconnecting the capacitors 14 from the conductors 18. Restoration of the armature 48 of the lookout relay to the deenergized position completes an energizing circuit through contact members 47a for returning the cutoff relay 40 to the energized position so that the breaker 10 may be reclosed in a subsequent operation.

Should the voltage relay 20 remain in the same operating position or return to it again, control relay 68 would again operate to provide for energizing the time delay relay 62. Operation of the time delay relay would effect operation of the sequence relay 55 to the next operating position or number 3 position, in which a tripping circuit for breaker 11 is set up through contact members 56d and a closing circuit is set up for circuit breaker 12 through contact member 56e. Operation of the sequence relay to this position completes the operating circuit for the auxiliary control relay 73, which thereupon completes a tripping circuit for breaker 11 through contact members 73c and contact members 56d. After a predetermined interval of time the control relay 68 returns to the deenergized position and the time delay relay 62 is deenergized to interrupt the energizing circuit for the operating winding 60 of the sequence relay 55.

Should the voltage relay 20 again call for the disconnection of a bank of capacitors the control relay 68 cannot again be operated. When all of the circuit breakers are in the open position further completion of an operating circuit for the control relay 68 is impossible since the return circuit from the operating winding 70 to the conductor 96 will be interrupted by contact members of the circuit breakers such as, for example, contact members 10b of breaker 10.

Should the voltage relay 20 operate to the operating position 1, as initially described, in which contact member 20a engages contact members 20b, the circuit breaker 10 will be closed in the manner hereinbefore described in detail. If the voltage relay 20 sequentially operates to the other operating position in which contact member 20a engages contact members 20c, the sequence relay will move to position 2 and circuit breaker 10 will be tripped in the manner hereinbefore described. Should the voltage relay 20 thereafter move to the initial operating position with the contact member 20a engaging contact members 20b, breaker 10 will not be reclosed, but instead, the sequence relay will move from position 2 in which breaker 10 was tripped to position 3 and a closing circuit will be set up for breaker 12 through contact members 72d and contact members 56e. If the voltage relay thereafter operates to its other operating position with contact member 20a engaging contact members 20c, the sequence relay 55 will be operated to the number 1 position and a tripping circuit will be completed for breaker 12 through contact members 73c and contact members 56d. If the next operation of the voltage relay 20 is again to be the initial operating position with contact member 20a engaging contact members 20b, the sequence relay will be actuated to the number 2 position and a closing circuit will be completed for breaker 11 through contact members 72b and contact members 56a. Should the voltage relay 20 thereupon move to its other operating position, the sequence relay will be actuated to position 3 and breaker 11 will be tripped.

From the above description and the accompanying drawing it will be apparent that I have provided, in a simple and effective manner, for equalizing the duty on both the circuit breakers and capacitors in automatic switching systems. Instead of one circuit breaker being successively opened and closed to make relatively minor corrections in the operating voltage of a power circuit, several switches are, according to my invention, sequentially operated so as to distribute the switching duty. By utilizing a switching system wherein a sequence relay successively sets up closing and tripping circuits for pairs of breakers in a predetermined sequence and the voltage relay determines which of these shall be completed, a simple and effective control system is provided which is relatively inexpensive to manufacture and is effective in operation.

Since certain changes may be made in the above described construction, and different embodiments of the invention may be made without departing from the spirit and scope thereof, it is intended that all the matter contained in the above description and shown in the accompanying drawing shall be considered as illustrative and not in a limiting sense.

I claim as my invention:

1. In an automatic switching system for a plurality of circuit devices, switch means operable to connect each of the devices to a power circuit, and control means connected to effect operation of the switch means including a sequence relay operable to set up different operating circuits for the switch means in a predetermined sequence and relay means selectively responsive to an electrical circuit condition of the power circuit to either complete one or the other of the circuits so set up, or to effect operation of the sequence relay to a different position in which the relay means is effective to complete one of the circuits set up by the sequence relay.

2. An automatic switching system for a plurality of circuit devices comprising, a circuit breaker for connecting each device to a power circuit, closing means for each of the breakers operable to provide for closing said breaker, trip means for each breaker operable to trip said breaker, a sequence relay operable to successive positions to set up an operating circuit for the closing means of one breaker and an operating circuit for the trip means of another breaker in different combinations for each of said positions, and control means including a control relay operable in response to an electric characteristic of the power circuit to effect operation of the sequence relay to different positions and to provide for completing an operating circuit either for one of the trip means or one of the closing means.

3. In an automatic control system, a plurality of circuit breakers each being associated with a device to connect it to an electric power circuit, closing and trip means for each of the breakers, a sequence relay operable to a plurality of different positions to partially complete an operating circuit for the closing means of a different breaker in each position and the trip means of another breaker, control means operable to different positions in response to variations in the voltage of the power circuit above or below a predetermined value, a time delay relay operable a predetermined time after said control means to operate the sequence relay to a different position, and relay means selectively responsive to operation of the control means to complete the operating circuit for the closing means of one breaker or the trip means of another breaker as selected by the sequence relay.

4. In a control system a plurality of circuit breakers associated with separate devices for connecting them to or disconnecting them from an electric power circuit, a sequence relay operable to different positions to set up a closing circuit for a different one of the breakers in each position and a trip circuit for another one of the breakers, a control relay responsive to the voltage of the power circuit, a time delay relay operable to operate the sequence relay, relay means responsive to operation of the control relay to effect operation of the time delay relay, and additional relay means of the latched in position type selectively responsive to operation of the relay means to complete one of the operating circuits set up by the sequence relay and to render the relay means inoperative and return the time delay relay to the inoperated position ready for a subsequent operation.

5. In a control system for a plurality of circuit breakers each disposed to connect a load device to a power circuit, a sequence relay successively operable to different positions to set up a closing circuit for a different breaker in each position and a trip circuit for another breaker in a predetermined sequence, a time delay relay operable to effect operation of the sequence relay to a different position each time, a voltage relay selectively responsive to variations in the voltage of the power circuit above or below a predetermined range of values, time delay relay means selectively responsive to operation of the voltage relay, said time delay relay means being disposed to remain in the energized position for a predetermined time after deenergization, and relay means selectively responsive to operation of the sequence relay and the time delay relay means to complete either a closing circuit or a trip circuit in cooperation with the sequence relay, said relay means being connected to effect deenergization of the time delay relay means.

6. A switching system for a plurality of circuit breakers disposed to connect separate load devices to a power circuit, a voltage relay operable to different positions in response to variations in the voltage of the power circuit above or below a predetermined value, relay means of the delayed dropout type selectively responsive to operation of the voltage relay to said different positions, auxiliary relay means selectively responsive to operation of said relay means to partially complete either a closing circuit or a trip circuit for each of the breakers, said auxiliary relay means having operating circuits selectively set up by said relay means, a time delay relay responsive to a predetermined time after operation of said relay means, and a sequence relay operable to a different position in response to each operation of the time delay to partially complete a closing circuit for one breaker and a trip circuit for another breaker so as to complete one of said circuits in conjunction with said auxiliary relay means.

7. In an automatic switching system for a plurality of circuit breakers disposed to connect separate load devices to or disconnect them from a power circuit, a voltage relay responsive to voltage conditions of the power circuit, a sequence relay operable to different positions to provide a partial closing circuit for one breaker in each position and a partial trip circuit for another breaker, time delay relay means of the delayed dropout type selectively responsive to operation of the voltage relay, time delay means operable a predetermined time after operation of said time delay relay means to provide for operating the sequence relay to a different position, auxiliary relay means jointly responsive to operation of the sequence relay and said time delay relay means to set up a partial closing circuit for each breaker or a partial trip circuit for each breaker, said auxiliary relay means being connected to effect deenergization of the time delay relay means, and circuit means responsive to the operating position of each breaker connected to prevent completion of a closing or tripping circuit for any breaker already closed or tripped.

WILLIAM H. CUTTINO.

REFERENCES CITED

The following references are of record in the file of this patent:

UNITED STATES PATENTS

| Number | Name | Date |
| --- | --- | --- |
| 1,718,517 | Bany | June 25, 1929 |
| 2,078,667 | Kado | Apr. 27, 1937 |
| 2,293,484 | Anderson | Aug. 18, 1942 |
| 2,295,388 | Cuttino | Sept. 8, 1942 |
| 2,420,922 | Wolley | May 20, 1947 |